United States Patent [19]
Draa

[11] 3,938,420
[45] Feb. 17, 1976

[54] MINE ROOF BOLT ANCHOR CONSTRUCTION
[75] Inventor: Wayne A. Draa, Alliance, Ohio
[73] Assignee: Gottschall Tool & Die, Inc., Salem, Ohio
[22] Filed: June 27, 1974
[21] Appl. No.: 483,790

[52] U.S. Cl. ................................................. 85/76
[51] Int. Cl.² ........................................ F16B 13/06
[58] Field of Search ............... 85/76, 85, 86, 87, 88, 85/75, 77, 79, 83, 74, 73, 67

[56] References Cited
UNITED STATES PATENTS
| | | | |
|---|---|---|---|
| 2,799,201 | 7/1957 | Genter | 85/87 |
| 3,577,825 | 5/1971 | Reusser | 85/76 |

FOREIGN PATENTS OR APPLICATIONS
| | | | |
|---|---|---|---|
| 668,073 | 7/1929 | France | 85/85 |
| 1,388,807 | 1/1965 | France | 85/85 |
| 430,603 | 8/1911 | France | 85/76 |

*Primary Examiner*—Edward C. Allen
*Attorney, Agent, or Firm*—Frease & Bishop

[57] ABSTRACT

A bolt anchor construction for attaching metal plates to the roof of a mine tunnel. An expansion shell having a plurality of spaced metal fingers is telescopically mounted on a bolt. A camming plug is threadably mounted on one end of the bolt and is located within and engaged with the spaced fingers. A series of coined teeth is formed in the outer surface of each finger with the rear of the teeth forming a smooth, flat, tapered surface extending downwardly outwardly with respect to the inner surface of the fingers. The camming plug forces the fingers outwardly upon rotation of the bolt whereupon the teeth bite into the rock surrounding the drilled hole to attach the plates to the mine roof. A pair of spaced longitudinally extending bearing strips is formed on the inner surface of each finger for engagement with the camming plug, and the teeth smooth rear surfaces are located between the bearing strips and are free of projections to prevent bending with the plug.

11 Claims, 16 Drawing Figures

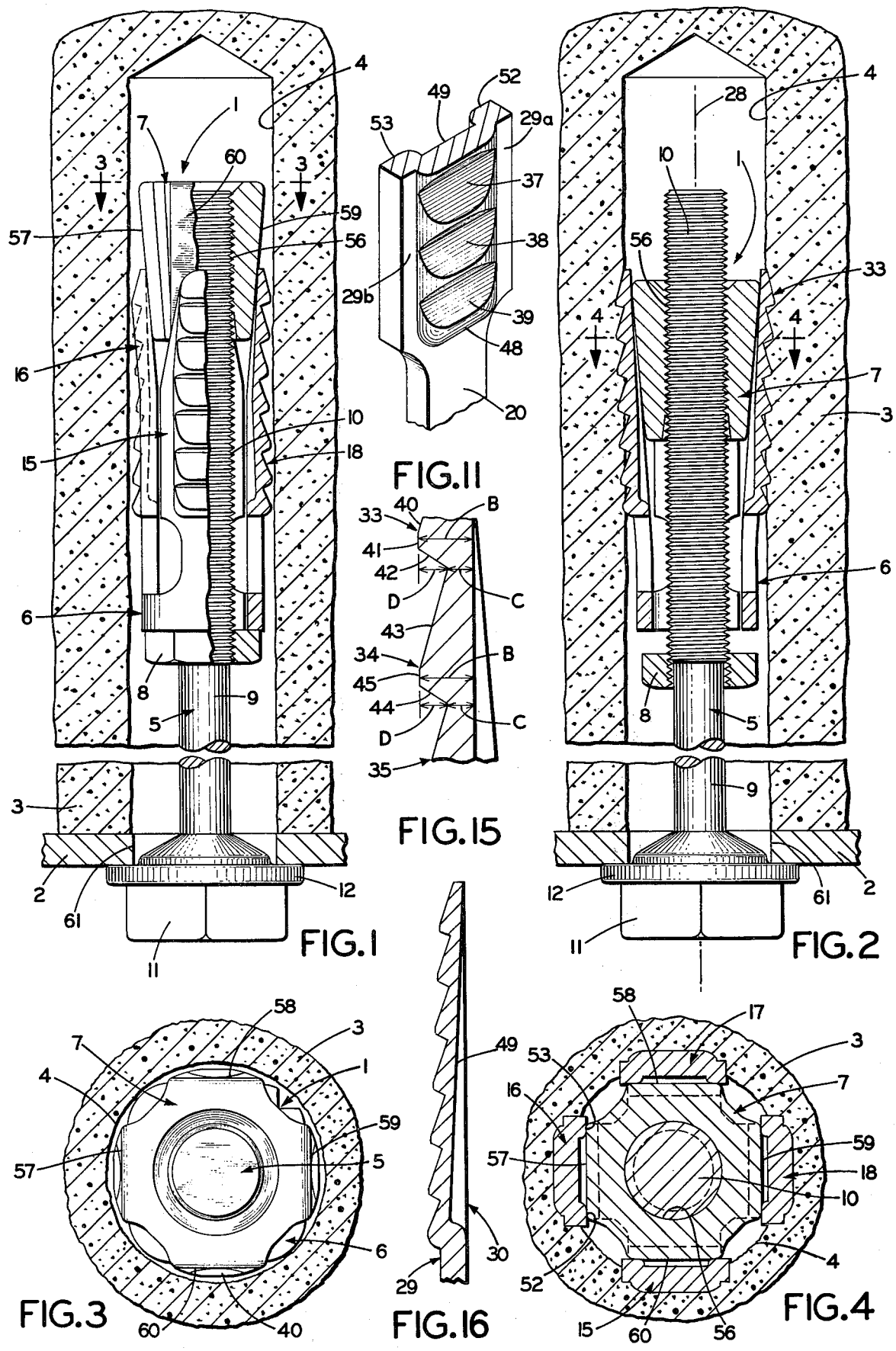

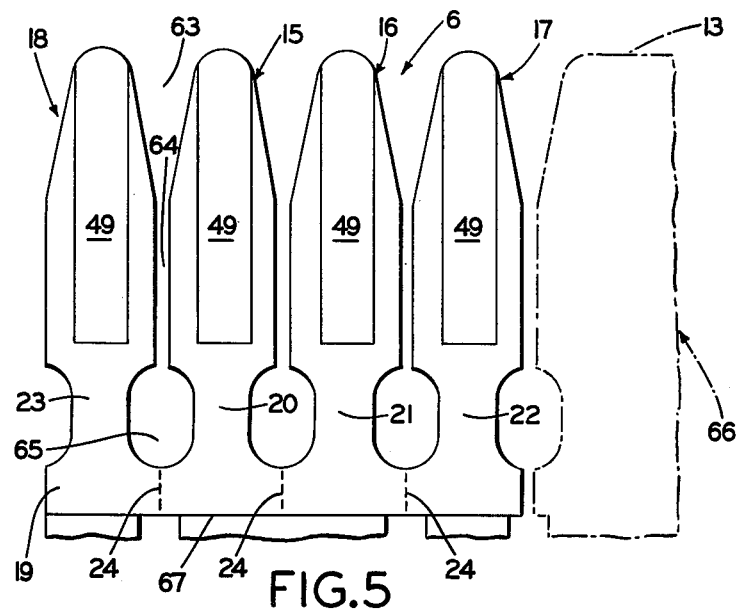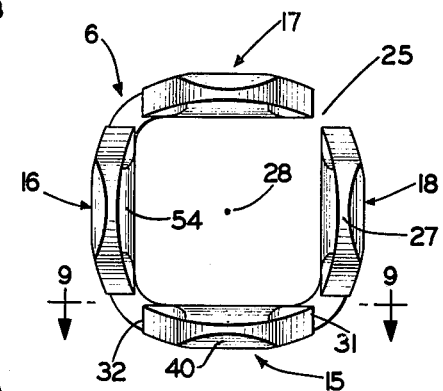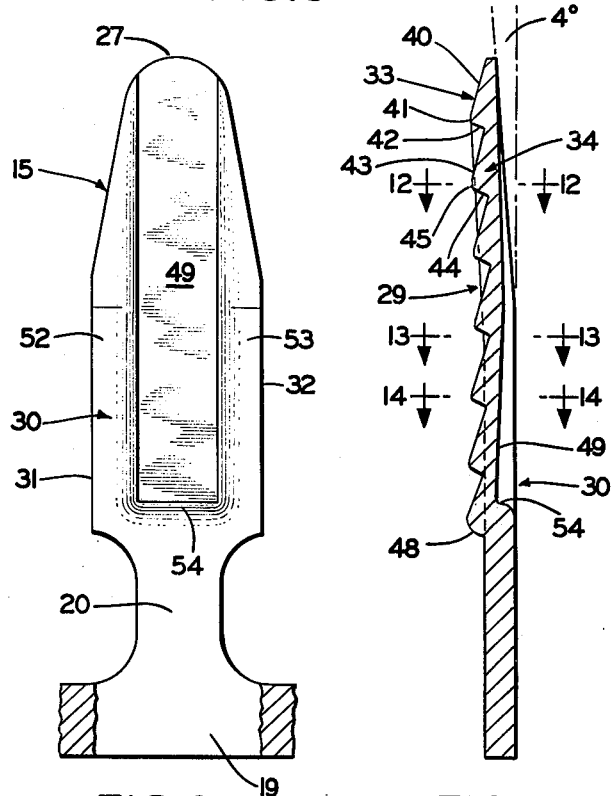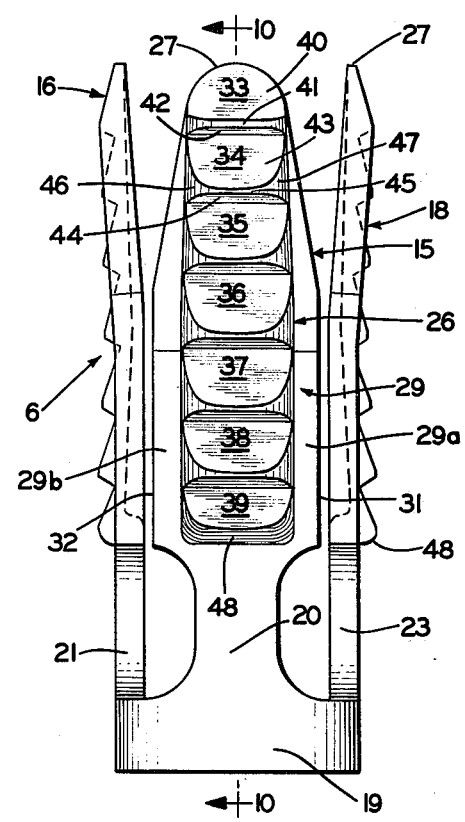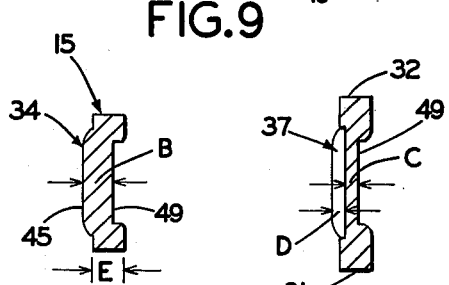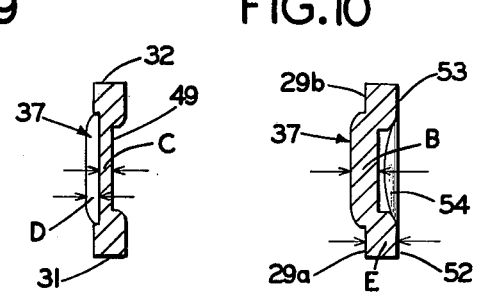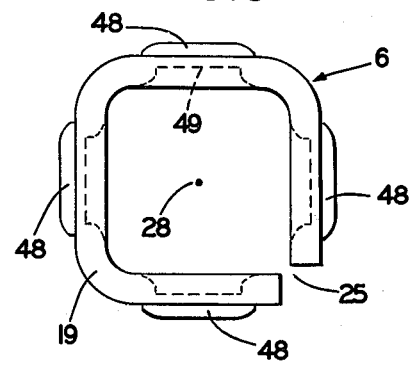

3,938,420

MINE ROOF BOLT ANCHOR CONSTRUCTION

BACKGROUND OF THE INVENTION

1. Field of the Invention

The invention relates to fastening devices and in particular to fastening devices having an expansion shell for gripping surrounding material to which an item is to be attached. More particularly, the invention relates to a bolt anchor construction for attaching metal plates to the roof of a mine tunnel in which the expansion shell has a plurality of fingers with a series of coined teeth for gripping the surrounding rock, and in which the fingers are expanded outwardly by a camming plug.

2. Description of the Prior Art

Numerous anchor bolt constructions and fastening devices have been devised for attaching articles together and in particular for attaching plates or other supports to surrounding rock, soil or strata. Examples of such anchor constructions are illustrated and described in U.S. Pat. Nos. 1,139,712, 1,513,301, 1,772,064, 1,802,270, 2,667,099, 2,762,119, 3,250,170, 3,315,557, 3,381,567 and 3,577,825. Most of these fasteners include a bolt having an expansion-type shell mounted thereon which is expanded outwardly into gripping contact with the walls of a drilled hole by a camming-type plug.

Expansion shells for such anchors are formed of malleable iron, stamped from metal sheets or hot formed in hot rolled steel sheets. The malleable iron shells present problems of breakage upon the fingers moving outwardly to grasp the surrounding walls of a drilled hole especially where voids or non-cylindrically shaped drill holes are encountered. The malleable iron shells also are expensive to produce in large quantities which are required for most mine installations. The hot rolled steel expansion shells eliminate much of the breakage problem, but also are expensive and difficult to produce in vast quantities.

Recently, expansion shells have been developed for such mine anchors which are stamped and coined from metal plates. Such stamping and coining procedures result in a strong, durable and inexpensive expansion shell, which can be mass produced more conveniently and economically than prior known shells. Problems, however, have been encountered with expansion shells of this type. The shell fingers have ribs or cross members extending transversely across the finger rear surface which form part of the camming plug bearing surfaces. The camming plug occasionally becomes tilted within the fingers while expanding the shell with the plug lower edged becoming engaged with such transverse ribs or projections, preventing complete advancement of the camming plug which is necessary to achieve maximum anchor holding power.

Thus, the need has existed for an anchor bolt construction having an expansion shell stamped, coined and formed from metal strips in which the inner surfaces of the shell fingers are free of projections or other transverse members in the vicinity of the camming surfaces to prevent binding of the camming plug.

No anchor bolt construction of which I am aware has an expansion shell stamped and coined from metal strips, which has inner finger bearing surfaces free of transverse members or other projections.

SUMMARY OF THE INVENTION

Objectives of the invention include providing a mine roof anchor bolt construction which is stamped and coined from a continuous metal strip, rapidly, economically and in large quantities; providing an anchor bolt construction in which the expansion shell has a plurality of spaced fingers, each finger having a series of teeth coined in the outer surface thereof and in which the teeth rear surface forms a continuously smooth, uninterrupted, tapered surface extending downwardly outwardly in the inner finger surface; providing an anchor bolt construction in which the teeth are equal in cross-sectional configuration and thickness when taken on corresponding generally radial lines through the teeth, and in which the depths or pitch of the teeth are equal; providing such a construction in which the metal of two longitudinal strips extending along the sides of the teeth as well as a collar and stem portions of the expansion shell are relatively unworked and have a metal thickness equal to that of the virgin metal strip from which the expansion shell is formed; providing such a construction in which the tops of the fingers of the expansion shell are flared outwardly at approximately 4° angles for receiving the end of the camming plug; and providing a construction in which the finger inner camming surfaces are free of transversely extending members and other projections which may engage the camming plug bottom edges causing binding of the plug within the expansion shell.

These objectives and advantages are obtained by the mine roof anchor bolt construction, the general nature of which may be stated as including a bolt having a threaded shank portion; a camming plug threadably engaged with said bolt for advancing along the threaded shank portion; an expansion shell including a plurality of metal fingers surrounding the bolt and engageable with the camming plug; the fingers each having outer, inner and side surfaces with a series of teeth being coined in each of said fingers and projecting outwardly from the outer finger surface; the teeth having smooth back surfaces tapered outwardly downwardly with respect to the finger inner surfaces; a pair of spaced generally planar bearing strips being formed in each of the finger inner surfaces and extending longitudinally adjacent the teeth side surfaces for engagement with the camming plug; the fingers inner surfaces being free of transversely-extending members between the plug bearing strips; the expansion shell having a collar and stem portions extending between the collar and fingers; the metal thicknesses of the collar, stem portions and longitudinal bearing strips being equal to each other and to the thickness of a virgin metal strip from which the expansion shell is formed; the teeth each having a major planar facet extending outwardly downwardly with respect to the shell finger and a minor planar facet extending upwardly outwardly with respect to the shell finger and forming a tooth crest at the junction with the major planar surface; and the teeth crests terminating in generally outwardly flared rounded ends.

BRIEF DESCRIPTION OF THE DRAWINGS

A preferred embodiment of the invention — illustrative of the best mode in which applicant has contemplated applying the principles — is set forth in the following description and shown in the drawings and is particularly and distinctly pointed out and set forth in the appended claims.

FIG. 1 is an elevational view showing the mine roof anchor bolt assembly, portions of which are in section and broken away, inserted within an opening in a mine roof prior to expansion;

FIG. 2 is a view similar to FIG. 1, showing the anchor bolt in expanded operating position;

FIG. 3 is an enlarged sectional view taken on line 3—3, FIG. 1;

FIG. 4 is an enlarged sectional view taken on line 4—4, FIG. 2;

FIG. 5 is an elevational view of the four fingers of the anchor bolt expansion shell shown in full lines, after stamping of a metal strip, and before final shaping;

FIG. 6 is an enlarged elevational view of the expansion shell in final folded position;

FIG. 7 is a bottom plan view of the expansion shell shown in FIG. 6;

FIG. 8 is a top plan view of the expansion shell shown in FIG. 6;

FIG. 9 is a sectional view taken on line 9—9, FIG. 8, showing the rear of one of the fingers of the expansion shell;

FIG. 10 is a sectional view taken on line 10—13, FIG. 6;

FIG. 11 is an enlarged fragmentary perspective view of the lower portion of one of the expansion shell fingers as shown in FIG. 6;

FIG. 12 is a sectional view taken on line 12—12, FIG. 10;

FIG. 13 is a sectional view taken on line 13—13, FIG. 10;

FIG. 14 is a sectional view taken on line 14—14, FIG. 10;

FIG. 15 is a greatly enlarged fragmentary sectional view of a portion of FIG. 10 showing one tooth of an expansion shell finger; and FIG. 16 is a fragmentary sectional view similar to FIG. 10 prior to imparting a 4° bend to the upper end.

Similar numerals refer to similar parts throughout the drawings.

DESCRIPTION OF THE PREFERRED EMBODIMENT

The improved bolt anchor construction is indicated generally at 1 and is shown in FIGS. 1 and 2 attaching a metal reinforcing plate 2 to a roof 3 of a mine tunnel. FIG. 1 shows bolt anchor assembly 1 located within a hole 4 drilled in mine roof 3 prior to being expanded to its holding position of FIG. 2. Bolt anchor assembly 1 includes as major components a bolt 5, an expansion shell 6, a camming plug 7, and a break-away type retaining nut 8.

Bolt 5 has a shank 9 with an upper threaded portion 10 and a head 11. A washer 12 preferably is located between head 11 and mine roof plate 2 when installing the roof plate. Retaining nut 8 is engaged with the lowermost threads of thread portion 10 to retain shell 6 in its assembled ready-to-use position in bolt 5 as shown in FIG. 1.

Improved shell 6 is shown in FIG. 5 in a flat prefolded condition after being stamped and coined in usual metal working procedures and prior to being folded into its final shape. The partial outline of the first finger 13 of a second expansion shell is shown in dot-dash lines and is part of a metal strip 66 from which shell 6 is formed.

Shell 6 has four fingers 15, 16, 17 and 18 integrally joined at their lower ends to a collar 19 by stem portions 20, 21, 22 and 23 respectively (FIG. 5). Collar 19 is folded along three imaginary lines 24 so that fingers 15-18 provide shell 6 with a rectangular configuration as shown in FIGS. 7 and 8. Each finger 15-18 is located perpendicularly with respect to the two adjacent fingers and diametrically opposite the third finger. When in folded position, an opening 25 is formed between the unconnected ends of collar 19. The separated collar ends can be welded and connected by other means if desired. However, the metal of shell 6 has sufficient rigidity to maintain the folded rectangular configuration, thereby eliminating the need for an additional collar end connecting operation.

Fingers 15-18 extend generally longitudinally along and parallel with the longitudinal axis of shell 6 indicated at 28 in FIGS. 2, 7 and 8. The top portions of fingers 15-18 are bent outwardly at approximately 4° angles (FIGS. 6 and 10) to provide a flared end to shell 6 for seating of camming plug 7 therein when bolt anchor 1 is in assembled position prior to installation in mine roof hole 4.

Fingers 15-18 preferably are identical in size, shape, and configuration, and thus only finger 15 is described in detail below and illustrated in the drawings. The following discussion with respect to finger 15 thus refers to fingers 16, 17 and 18 as well.

Finger 15 includes generally smooth outer and inner surfaces 29 and 30 respectively, and side edges 31 and 32 extending therebetween. A series of teeth or toothed portion 26 is coined or cold metal formed in finger 15 and extends longitudinally from outer finger end 27 to adjacent stem 20. Teeth 26 are spaced inwardly from side edges 31 and 32 and form longitudinal strips 29a and 29b therebetween in outer surface 29.

Teeth 26 project upwardly outwardly from outer surface 29 and consist of a series of seven teeth indicated generally at 33-39 in descending order downwardly along finger 15. Finger 15 may be formed with more or less than the seven fingers illustrated if desired, in order to achieve different holding and gripping qualities depending upon the type of rock into which bolt anchor assembly 1 will be inserted.

Topmost end tooth 33 includes a major planar facet 40 having a rounded top end configuration as shown in FIGS. 6 and 15, which conforms to finger outer end 27. Major facet 40 extends from top end 27 of finger 15 downwardly outwardly therefrom and terminates at a tooth crest 41. A minor planar facet 42 projects downwardly inwardly with respect to major facet 40 and merges with major facet 40 at a tooth crest 41 which extends transversely across finger 15.

The next six teeth 34-38 preferably are identical to each other and thus only tooth 34 is described in detail. Tooth 34 includes a major planar facet 43 extending outwardly downwardly from finger 15 and a minor planar facet 44 which extends downwardly inwardly from major facet 43. Facets 43 and 44 terminate and form tooth crest 45 which extends generally transversely across tooth 34 terminating in outwardly flared, curved ends 46 and 47. Teeth 34-38 differ only slightly from top tooth 33 in that major planar facets 43 do not have curved top ends as does tooth 33 and that crests 45 have outwardly flared ends.

Bottom tooth 39 is identical to teeth 34-38 except that the lower tooth portion 48 does not have a minor planar facet similar to facets 44 but has a generally rounded, curved configuration, as shown in FIGS. 6 and 10.

In accordance with the invention, teeth 26 are formed with a flat, smooth, longitudinally-extending back surface 49. Surface 49 is tapered downwardly outwardly with respect to finger inner surface 30 when teeth 26 are coined as shown in FIG. 16 prior to imparting the 4° bend to the upper ends of the fingers.

After bending finger 15 from its straight position of FIG. 16 to its bent position of FIG. 10, back teeth surface 49 still is free of any transversely extending members or projections which could engage an edge of camming plug 7 and result in incomplete expansion of shell 6.

Surface 48 forms a pair of parallel, spaced, longitudinally-extending bearing strips 52 and 53 on inner surface 30 of finger 15 (FIG. 9) which engages the camming surfaces of plug 7. The lower end of teeth back surface 49 joins stem 20 in a generally rounded shoulder 54. The upper ends of bearing strips 52 and 53 taper inwardly and merge with the top end of surface 49 and finger end 27 shown in FIGS. 9 and 10.

In further accordance with the invention, the cross-sectional thicknesses and configurations of teeth 33–38 are equal. FIG. 15 is an enlarged sectional view of tooth 34 and portions of teeth 33 and 35 to illustrate the similarity between teeth 33 through 38 and the characteristics thereof.

The thicknesses of crests 41 and 45 of teeth 33–38 are equal as indicated at "B". Likewise, the corresponding teeth thicknesses taken at the junction of major planar facets 43 and minor planar facets 42 and/or 44 of the next below tooth indicated at "C" are equal for teeth 33–38. The heights or pitch of teeth 33–38 are indicated at "D" also are equal to each other. Thickness "B" of the teeth crests are formed so as to be equal to or preferably thinner than the thickness of longitudinal strips 52, 29a and 53, 29b.

Camming plug 7 is similar to camming plugs used for several known anchor bolt constructions, such as shown in U.S. Pat. No. 3,377,825. Plug 7 has a threaded bore 56 for engagement with threaded portion 10 of shank 9 and is formed with a plurality of tapered, flat sides 57, 58, 59 and 60 which are adapted to engage and slide along the longitudinal bearing strips 52 and 53 of fingers 15–18. Plug 7 is threadably advanced along bolt 5 until it is firmly seated within the flared ends of fingers 15–18 (FIG. 1), with shell 6 being retained on bolt 5 by plug 7 and retaining nut 8, with fingers 15–18 surrounding bolt 5.

Bolt assembly 1 is installed in a mine roof 3 by inserting assembly 1 through a hole 61 in roof plate 2 which aligns with hole 4 until washer 12 is clamped between bolt head 11 and plate 2 as shown in FIG. 1. Bolt head 11 then is rotated by a wrench or power tool which advances plug 7 downwardly along threaded shank portion 10 expanding fingers 15–18 outwardly whereby teeth 33–39 become embedded in the rock of the mine roof surrounding hole 4.

Shell 6 probably will move downwardly a short distance upon rotation of bolt 5 until teeth 33–39 become completely engaged with the surrounding rock, thereby stripping the threads of retaining nut 8 which is no longer required for operation of bolt anchor 1. A wire bale or various other retaining means may be used instead of nut 8 without affecting the concept of the invention.

Improved expansion shell 6 is formed by usual metal working, stamping and coining procedures, preferably in a high-tonnage metal press in a progressive die. A continuous metal strip is fed through the press which forms the finger outlines by notching areas 63, 64 and 65 between adjacent fingers as shown in FIG. 5. Teeth 26 then are coined by compression between the die components. The finger ends then are bent outwardly approximately 4° followed by the subsequent step of partially closing the shell by bending collar 19 along the outer two imaginary bend lines 24. The final step consists of completely closing shell 6 to form the rectangular configuration of FIGS. 6–8, while generally simultaneously with the shell closing shearing shell 6 from strip 66 along shear line 67.

Upon working and coining teeth 26, the metal of collar 19, stems 20–23 and longitudinal strips 29a, 29b, 52 and 53 remains relatively unworked and has a thickness "E" (FIGS. 10, and 12–14) which corresponds to the thickness of the virgin metal strip from which shell 6 is formed. Teeth 26, likewise are formed so that teeth crest thicknesses indicated at "B" are equal to or less than thickness "E".

Accordingly, the improved bolt anchor construction provides a mine roof anchor which can be produced economically and conveniently by cold working of metal strips eliminating hot metal working or malleable iron casting procedures heretofore required; provides a construction which is extremely strong and durable having hardened teeth which can bite into and grip surrounding rock surfaces without breaking due to minor indentations and variations in the cylindrical wall of the drilled hole; provides a construction with an expansion shell having a plurality of metal fingers with coined teeth, the back surfaces of which are flat, smooth areas free of transverse members or projections with which the lower edges of the camming plug could become engaged resulting in incomplete expansion of the shell within the drilled hole; provides such an expansion shell having a series of teeth formed in the shell fingers in which the thicknesses of the teeth crests are equal as is the metal thickness between adjacent teeth, and in which the heights or pitch of the teeth are equal; provides a construction in which the thicknesses of the teeth crests of the expansion shell are equal to or less than the thickness of the virgin metal strip from which the teeth are formed, and in which the metal of the stem, collar, and finger portions adjacent the series of teeth are relatively unworked during formation of the teeth; and provides a construction which eliminates difficulties existing in the prior art and which achieves the stated objectives and solves problems that have existed in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries, and principles of the invention, the manner in which the improved mine roof bolt anchor construction is constructed, assembled and operated, the characteristics of the new construction, and the advantageous, new and useful results obtained; the new and useful structures, devices, elements, arrangements, parts, and combinations are set forth in the appended claims.

I claim:

1. Mine roof bolt anchor construction including:
   a. a bolt having a threaded shank portion;
   b. a camming plug threadably engaged with said bolt for advancement along the threaded shank portion;
   c. an expansion shell mounted on the bolt;
   d. the expansion shell including a plurality of metal fingers surrounding the bolt and engageable with the camming plug;
   e. the fingers each having a free end and outer, inner and side surfaces;
   f. a series of teeth coined in each of said fingers and projecting outwardly from the outer finger surface;
   g. each finger inner surface having a pair of spaced generally planar bearing strips extending longitudinally adjacent the finger side surfaces engageable with the camming plug, and a single rectangular planar surface extending between said bearing strips;
   h. the rectangular planar surface being tapered from the finger free end outwardly away from the bearing strips, and the teeth being coined from finger material displaced in forming said tapered planar surface, with the rectangular planar surface constituting a smooth back surface for the series of teeth and forming the entire area between the spaced bearing strips;
   i. the majority of the teeth include major planar facets extending outwardly downwardly with respect to the outer finger surface and minor planar facets extending outwardly upwardly with respect to the outer finger surface;
   j. and tooth crests being formed by the junctions of said major and minor planar facets and extending transversely with respect to the shell fingers.

2. The construction defined in claim 1 in which the fingers each terminate at an end opposite of the finger free end in a collar, and in which each finger includes a stem portion extending between said collar and the teeth.

3. The construction defined in claim 2 in which the rectangular planar teeth back surface of each finger extends between the outer free end of the finger and the stem portion.

4. The construction defined in claim 3 in which a rounded shoulder extends between the teeth back surface and stem portion of each shell finger.

5. The construction defined in claim 2 in which the metal thicknesses of the collar, stem portions, and bearing strips are generally equal; and in which said thicknesses are generally equal to the thickness of a virgin metal strip from which the expansion shell is formed.

6. The construction defined in claim 1 in which the thicknesses of the teeth measured along corresponding radial lines generally are equal.

7. The construction defined in claim 1 in which the teeth crests terminate in generally outwardly flared, rounded ends.

8. An expansion shell for a mine roof bolt anchor construction of the type having a bolt with a threaded shank portion, in which a camming plug is threadably engaged with the bolt, in which the expansion shell is telescopically mounted on the bolt and engageable with the camming plug, and in which the shell is expanded outwardly upon advancement of the plug along the threaded shank portion within the expansion shell; the expansion shell including:
   a. a collar and a plurality of metal fingers extending from said collar;
   b. the fingers each having a free end and outer, inner and side surfaces;
   c. a series of teeth coined in each of said fingers and projecting outwardly from the outer finger surface;
   d. each finger inner surface having a pair of spaced generally planar bearing strips extending longitudinally adjacent the finger side surfaces engageable with the camming plug, and a single rectangular planar surface extending between the bearing strips;
   e. the rectangular planar surface being tapered from the free finger end outwardly away from the bearing strips and forming the entire area between the spaced bearing strips and constituting a smooth back surface of the series of teeth, with the teeth being formed from finger material displaced in forming the planar back surface;
   f. certain of the teeth each includes a major planar facet extending outwardly downwardly with respect to the outer finger surface and a minor planar facet extending outwardly upwardly with respect to the outer finger surface;
   g. and tooth crests being formed by the junction of said major and minor planar facets, with the metal thicknesses of certain teeth crests being equal.

9. The construction defined in claim 8 in which the metal thicknesses of the collar, stem portions, and bearing strips are generally equal; and in which said thicknesses are generally equal to the thickness of a virgin metal strip from which the expansion shell is formed.

10. The construction defined in claim 8 in which the teeth crests terminate in generally outwardly flared, rounded ends.

11. The construction defined in claim 8 in which a rounded shoulder extends between the teeth back surface and stem portion of each shell finger.

* * * * *